M. GARLAND,

Assignor to GARLAND, INGRAM & CO.

Sawdust Feeder for Furnaces.

No. 9,695. Reissued May 10, 1881

WITNESSES =

E. Wolff.

Jacob Felbel

INVENTOR =

M. Garland

By att.

J. N. Mc Intire

UNITED STATES PATENT OFFICE.

MICHAEL GARLAND, OF BAY CITY, MICHIGAN, ASSIGNOR TO GARLAND, INGRAM & CO., OF WEST EAU CLAIRE, WISCONSIN.

SAWDUST-FEEDER FOR FURNACES.

SPECIFICATION forming part of Reissued Letters Patent No. 9,695, dated May 10, 1881.

Original No. 127,335, dated May 28, 1872. Application for reissue filed April 9, 1881.

*To all whom it may concern:*

Be it known that I, MICHAEL GARLAND, formerly of West Eau Claire, Wisconsin, but now of Bay City, in the county of Bay and State of Michigan, have invented certain new and useful Improvements in Sawdust-Feeders for Furnaces; and I do hereby declare the following to be a full, clear, and exact description thereof, reference being had to the accompanying drawings, making part of this specification, and to the letters of reference marked thereon.

My invention relates to contrivances adapted to mechanically feed the sawdust to nests of saw-mill boilers without opening the doors of the furnace to permit the ingress of the fuel to the grate-bars of the latter; and it consists, first, in the employment, in combination with the boiler-furnace, of a peculiarly constructed and arranged trunk containing an endless conveyer or chain and a series of feeder tubes or spouts extending from said trunk downward into the fire-chamber of the furnace, the upper ends of said tubes communicating with the interior of said trunk and being provided with slide-valves, while their lower ends open into the said fire-chamber between the boilers, and the said trunk communicates at or near one end with a chute or carrier, which supplies the sawdust to said trunk, all as will be hereinafter more particularly set forth and described.

My invention consists, secondly, in the employment, in combination with the said devices, of a supplemental spout or tube, communicating at its upper end with the said trunk at a point in the latter beyond the series of feeder-spouts, and adapted to discharge from the said trunk any and all material which may be conveyed past the valvular communications, and not allowed to pass through said communications into said feeder-spouts, whereby means are provided for the continuous passage of the sawdust from the mill through the said trunk, and for the discharge of it from the latter whenever the material may be automatically fed to the said trunk in greater quantity than may be needed for consumption by the furnace fed by the said feeder-spouts, all as will be hereinafter more fully set forth.

To enable those skilled in the art to make and use a contrivance embracing either or both of the features of my said invention, I will now proceed to more fully describe an apparatus embodying my said improvements.

Figure 1:
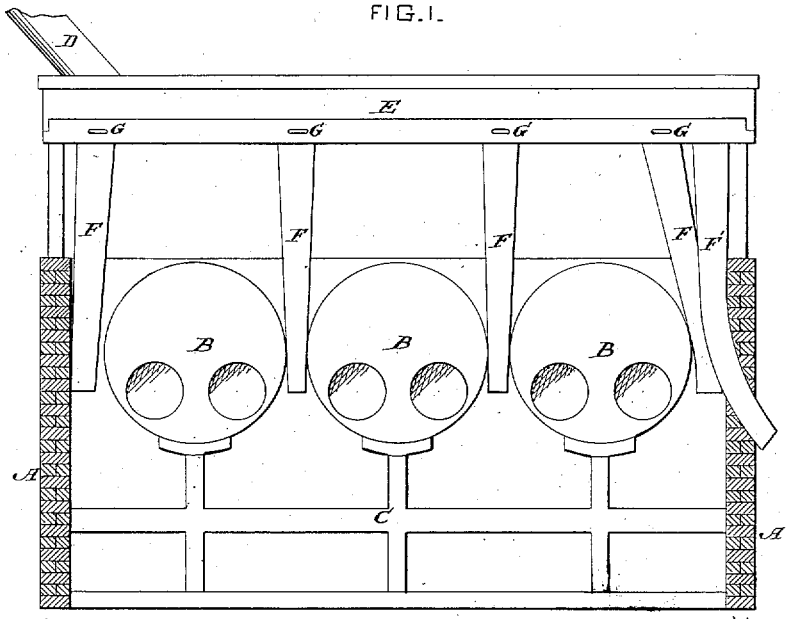
Figure 2:
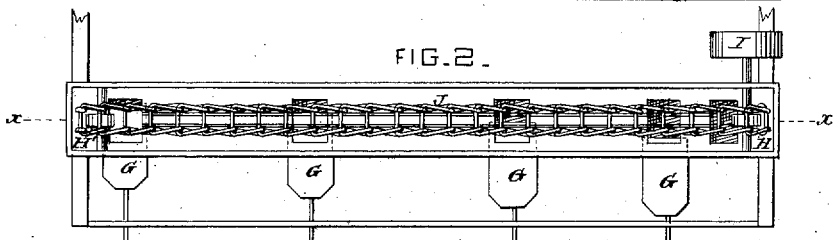
Figure 3:
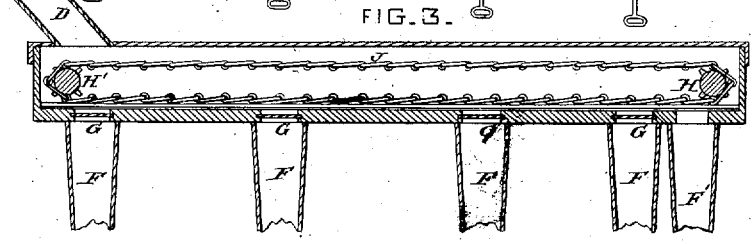

In the accompanying drawings, Figure 1 is an end elevation of a nest of boilers with the fire-front removed, in order to more clearly show the construction of my improved means for mechanically feeding the fuel to the furnace-chamber. Fig. 2 is a plan of the distributing-trunk, and Fig. 3 is a vertical section at the line *x x* of Fig. 2.

In the several figures the same part will be found designated by the same letter of reference.

A represents an arch, in which are set the steam-boilers B, the fire-front being removed in order to more clearly show them.

C represents the front support of the fire-grates, which are preferably of perforated metal.

D is the lower end of a sawdust-carrier discharging the material as fast as made by the saws of the mill into one end of the horizontal iron trunk E, which is erected over the front part of the battery, as shown. From this iron trunk E depend a number of iron spouts, F, which are supplied with sawdust (at their upper ends) from the trunk E, and which discharge said material from their lower ends directly into the furnace between and at the sides of the boilers.

At the top of each spout F, where it communicates with the interior of trunk E, there is a slide or valve, G, which may be either closed or wholly or partially opened by the fireman or engineer, as circumstances may require.

At that end of the trunk E opposite to where the carrier or supply chute D enters said trunk there is a spout or overflow-tube, F′, which may be arranged to discharge any material fed into it either on the hearth or outside of the fire-room, as may be preferred.

H H′ are chain-wheels arranged within and journaled at either end of the metallic trunk E, as shown, one of said wheels, H, being rotated or driven by a belt from any convenient driving-pulley in the mill, passed around the pulley I on the projecting end of the shaft of said wheel.

J is an endless conveyer-chain passing around and engaging in a usual manner with the peripheries of the chain-wheels H H′.

The operation of the contrivance shown and so far described may be thus briefly explained: The sawdust of the mill, being led into or supplied to the trunk E, at one end by the chute or carrier D, is conveyed continuously along in said trunk by the conveyer-chain J, and if the valve G be open the sawdust will be continuously fed into the upper ends of the iron spouts F and discharged from the lower ends of said spouts directly into the fire-chamber of the furnace. In setting open the valves G to effect a supply of the fuel to the furnace the valve nearest the supply source or carrier D should be opened a little, the next valve should be opened a little farther, and so on, the last one being set nearly or quite wide open.

In this manner will be insured the delivery of about an equal quantity of fuel through each one of the series of spouts F, and by opening or closing more or less all the valves G the entire volume fed through all the spouts F may, of course, be regulated and controlled at the will of the operator.

The method of adjusting the valves G relatively, so that the conveyer-chain will sweep about equal quantities of the fuel into the mouth of each feeder-spout F, will be seen clearly illustrated at Fig. 2, where the darkly-shaded spaces represent the openings through which the sawdust can pass into the several spouts F. In case more sawdust is made than is required to fire the furnace, all in excess of that which can pass through the valves G, and thence through spouts F into the fire-chamber, is carried beyond the series of spouts F by the continously-moving conveyer-chain J, and fed into the upper communicating end of the surplus or overflow spout F′, through which the surplus material is passed to any desired destination for future use.

The communication between the upper end of the overflow-spout F′ and the trunk E having no valve, and being always open, it follows that in the event of either a clogging of one or more of the spouts F or any necessary closing of the valves G the sawdust made and delivered to the trunk E will simply be conveyed to and discharged through the supplemental spout F′ without any derangement of or damage to any of the parts of the apparatus.

It is essential that the trunk and spouts be constructed of metal, for if made of wood or other inflammable material they would be liable to catch fire, especially in the event of any one or more of the spouts becoming clogged or choked with the sawdust.

Made as shown and described, the use of the contrivance involves no risk of fire to the mill whatever; and while simple and economic of construction and not liable to get out of order, it renders most efficient service as a perfect mechanical feeder of the sawdust directly and properly into the fire-chamber of the furnace without the necessity for any opening of the doors.

Having now so fully described the construction and operation of a contrivance made according to my invention that those skilled in the art can practice the latter, what I claim as new, and desire to secure by Letters Patent, is—

1. In combination with a steam-boiler furnace, the trunk E, having an inclosed endless conveyer-chain, J, and connected with the source of supply of the fuel, and the series of feed-spouts F, extending from said trunk to the interior of the fire-chamber of the furnace, and provided at their upper ends with slides or valves G, the whole constructed to operate substantially as and for the purpose set forth.

2. In combination with the trunk E, provided with a conveyer, J, and the series of feeder-spouts F, for supplying the furnace with the fuel fed from the mill into the said trunk, a supplemental surplus exit-pipe or overflow-spout, F′, arranged to operate in substantially the manner and for the purposes described.

In testimony whereof I have hereunto set my hand this 1st day of March, 1881.

MICHAEL GARLAND.

In presence of—
D. M. VILAS,
O. H. INGRAM.